(12) United States Patent
Recker et al.

(10) Patent No.: US 11,536,021 B2
(45) Date of Patent: Dec. 27, 2022

(54) ADJUSTABLE PLATE SUPPORT FOR A PRECAST CONCRETE PANEL

(71) Applicant: Meadow Burke, LLC, Riverview, FL (US)

(72) Inventors: Michael J. Recker, Palmetto, FL (US); Sidney E. Francies, III, Lithia, FL (US)

(73) Assignee: Meadow Burke, LLC, Riverview, FL (US)

( * ) Notice: Subject to any disclaimer, the term of this patent is extended or adjusted under 35 U.S.C. 154(b) by 0 days.

(21) Appl. No.: 17/000,019

(22) Filed: Aug. 21, 2020

(65) Prior Publication Data
US 2021/0054615 A1 Feb. 25, 2021

Related U.S. Application Data

(60) Provisional application No. 62/891,057, filed on Aug. 23, 2019.

(51) Int. Cl.
*E04B 1/41* (2006.01)
*F16B 5/08* (2006.01)

(52) U.S. Cl.
CPC . *E04B 1/41* (2013.01); *F16B 5/08* (2013.01)

(58) Field of Classification Search
CPC ..................................... E04B 1/41; F16B 5/08
USPC ....................................................... 52/649.1
See application file for complete search history.

(56) References Cited

U.S. PATENT DOCUMENTS

| | | | | |
|---|---|---|---|---|
| 3,378,968 A * | 4/1968 | Shoemaker | ............. | E04G 13/00 52/155 |
| 3,471,988 A * | 10/1969 | Allen | ......................... | E04B 1/41 52/714 |
| 3,878,655 A * | 4/1975 | Toth | .......................... | E04B 1/98 52/27 |
| 3,964,219 A * | 6/1976 | Hala | .......................... | E04B 1/41 52/105 |
| 4,404,779 A * | 9/1983 | Calhoun | ................... | E04B 5/48 52/126.2 |

(Continued)

FOREIGN PATENT DOCUMENTS

| | | | | |
|---|---|---|---|---|
| DE | 3405624 A1 * | 8/1984 | ........... | E04G 11/085 |
| DE | 20202295 U1 * | 6/2003 | .............. | F16B 5/123 |

(Continued)

*Primary Examiner* — James M Ference
*Assistant Examiner* — Joseph J. Sadlon
(74) *Attorney, Agent, or Firm* — Sheridan Ross P.C.

(57) ABSTRACT

A weldment support for holding a weldment plate in a precast concrete form is provided. The weldment support holds the weldment plate at a predetermined position so that the weldment plate is exposed on one side of the finished precast concrete panel. Weldment plates have one or more studs extending into the form to anchor the plate in the precast concrete panel. The weldment support has multiple adjustment features to secure the weldment support to different sizes of studs and to set the weldment plate at different positions within the form. In some embodiments, one adjustment feature is a plurality of deflectable fingers that engage the stud of the weldment plate, and another adjustment feature is a plurality of segments that can be broken off of the support to set the position of the weldment plate in the form.

13 Claims, 5 Drawing Sheets

(56) References Cited

U.S. PATENT DOCUMENTS

| | | | |
|---|---|---|---|
| 4,612,751 A * | 9/1986 | Gloppen | E04C 5/02 |
| | | | 52/250 |
| 5,150,553 A * | 9/1992 | Commins | E04B 1/0007 |
| | | | 52/264 |
| 5,224,307 A * | 7/1993 | Lukos | F16B 7/187 |
| | | | 403/187 |
| 6,102,607 A * | 8/2000 | Kintscher | B28B 23/005 |
| | | | 52/587.1 |
| 6,820,390 B2 | 11/2004 | Schulze | |
| 6,823,635 B2 | 11/2004 | Schulze et al. | |
| 7,065,930 B2 | 6/2006 | Schulze | |
| 7,217,059 B1 * | 5/2007 | Rudduck | E04B 2/7457 |
| | | | 403/324 |
| 9,074,379 B2 * | 7/2015 | Ciuperca | E04G 17/14 |
| 9,151,061 B2 * | 10/2015 | Schaefer | E04F 19/02 |
| 9,249,732 B2 * | 2/2016 | McAlice | F01D 25/14 |
| 9,347,232 B1 * | 5/2016 | Francies, III | E04G 15/04 |
| 9,765,540 B2 * | 9/2017 | Maunder | E04G 23/0229 |
| 9,963,871 B2 * | 5/2018 | Clark, Jr. | E04B 1/41 |
| 10,253,511 B2 * | 4/2019 | Sollars | B28B 7/241 |
| 10,619,661 B2 * | 4/2020 | Hagedorn | B60R 11/00 |
| 10,975,565 B2 * | 4/2021 | Gilman | E04G 13/00 |
| | | | 52/155 |
| 2006/0260238 A1 * | 11/2006 | Barcons | E04G 11/20 |
| | | | 52/414 |
| 2007/0144094 A1 * | 6/2007 | Schulze | E04B 1/41 |
| | | | 52/365 |
| 2011/0047918 A1 * | 3/2011 | Wehrli | E04C 2/044 |
| | | | 52/506.03 |
| 2014/0332658 A1 * | 11/2014 | Ciuperca | E04G 17/0658 |
| | | | 249/40 |

FOREIGN PATENT DOCUMENTS

| | | | | |
|---|---|---|---|---|
| EP | 1467038 A1 * | 10/2004 | | E04B 2/94 |
| EP | 2792804 A1 * | 10/2014 | | E04G 21/185 |
| IT | 1047378 B * | 9/1980 | | B28B 19/00 |
| KR | 200469048 Y1 * | 9/2013 | | E04B 2/8647 |
| KR | 101426497 B1 * | 8/2014 | | B28B 19/00 |
| KR | 101469746 B1 * | 12/2014 | | E04B 1/41 |
| WO | WO-2007025687 A1 * | 3/2007 | | F16B 2/243 |

* cited by examiner

ADJUSTABLE PLATE SUPPORT FOR A PRECAST CONCRETE PANEL

CROSS-REFERENCE TO RELATED APPLICATIONS

This application claims priority under 35 U.S.C. § 119(e) to U.S. Provisional Patent Application Ser. No. 62/891,057 filed on Aug. 23, 2019, which is incorporated herein in its entirety by reference.

FIELD

The present disclosure relates generally to a weldment plate support that supports a weldment plate in position in a precast concrete form during the manufacture of a precast concrete panel.

BACKGROUND

Precast concrete panel construction is an efficient and cost effective way to build a concrete structure since no time is spent pouring concrete and waiting for the concrete to cure onsite. Instead, the panels may be poured into a form and cured offsite in a controlled manufacturing facility, thus saving time as the concrete structure is built. The precast concrete panels can be transported onsite, as needed, and workers can move the panels into the desired position and secure the panels in place to form the concrete structure.

Weldment plates are metal plates that are selectively positioned on a surface of the precast concrete panel so that a portion of a surface of the panel is metal. This allows the panels to be welded into place with other structural members or serve other functions. Typically, weldment plates are placed on top of the uncured concrete in the form, and after the concrete partially cures, the position of the weldment plate is adjusted. This process results in an inaccurate and imprecise positioning of the weldment plate, which can cause problems during assembly. Weldment supports are known in the art to set the position of the weldment plate in the form as the concrete is poured into the form. However, these supports have several shortcomings such as limited vertical adjustability, being brittle, limited with respect to size of supports that can be used, etc.

More specifically, prior art supports typically engage a distal end of a stud extending from the bottom surface of the weldment plate. The stud helps anchor the weldment plate into the finished precast concrete panel. The support has a specifically-sized feature to engage the head of the stud, and the support also sets a fixed distance between the stud and the form to set the height of the weldment plate in the form. However, a different support is needed for different stud sizes and also different panel sizes where the weldment plate needs to be set a different height in the form. Therefore, a different support is needed for each difference in stud size and panel size, and with only a few different sizes, the number of supports becomes numerous, which increases costs.

SUMMARY

The present disclosure provides a weldment plate support that holds multiple sizes of studs extending from the weldment plate and can hold the weldment plate in multiple positions within the concrete form. In some embodiments, the weldment support has a first adjustment feature that engages the body of the stud extending from the weldment plate and can accommodate multiple stud body diameters, for example, two common diameters of ½" and ¾". Similarly, the weldment support has a second adjustment feature that engages a bottom portion of the concrete form, and the second adjustment feature is adjustable in vertical height. Thus, the weldment support can hold the weldment plate at different positions within the concrete form to accommodate different size precast concrete panels.

It is an aspect of various embodiments of the present disclosure to provide a plate support with an adjustment feature that has a plurality of fingers to engage a body of a stud or projectile extending from a weldment plate. In some embodiments, at least one of the fingers is configured to be positioned on one side of the body and another one of the fingers is configured to be positioned on the other side of the body. When the fingers engage the body of the stud, the fingers are generally oriented perpendicular to the body. As the fingers press into the stud, the fingers deflect outward to receive the stud, and then deflect at least partially inward when the fingers fully receive the stud. The deflection of the fingers allow the fingers to receive bodies with different diameters.

It is another aspect of embodiments of the present disclosure to provide a plate support with another adjustment feature that has a plurality of segments positioned at a lower end of a body of the plate support. The segments can be a lower portion of the body that are defined by frangible lines or portions. Segments can then be selectively removed, starting with the lower-most segment, by breaking the frangible portions and adjusting the length of the plate support. In some embodiments, the segments are sized in ½" increments to match the different sizes of precast concrete panels.

It is a further aspect of embodiments of the present disclosure to provide a plate support with a top flange, a body, and a second adjustment feature that are aligned along a longitudinal axis. The bottom surface of the weldment plate is configured to contact the top flange of the plate support, and the body extends from the top flange through the second adjustment feature. This arrangement provides an increased columnar strength of the plate support to hold heavier weldment plates and/or utilize less material in the weldment support. In addition, the cross sectional shape of the body and the segments can resist deflection of the plate support out of alignment with the longitudinal axis. It will be appreciated that the plate support can be made from a variety of materials, including injection-molded plastic.

One particular embodiment of the disclosure is an adjustable plate support for positioning a weldment plate within a precast concrete panel, comprising a body extending between an upper end and a lower end along a longitudinal axis; a plurality of segments of the body positioned at the lower end of the body, wherein a frangible portion is located between adjacent segments of the plurality of segments; and a plurality of fingers extending away from the body, the plurality of fingers positioned between the upper end and the plurality of segments along the longitudinal axis, wherein at least two fingers of the plurality of fingers are configured to deflect in opposing directions about the longitudinal axis to receive a stud extending from a weldment plate, wherein the plurality of fingers are configured to position the stud substantially parallel to the body.

In some embodiments, the support further comprises a top flange positioned at the upper end of the body, wherein the top flange has a larger cross sectional area compared to a cross sectional area of the body. In various embodiments, the plurality of fingers is offset from the upper end of the body along the longitudinal axis by a predetermined distance, and each finger of the plurality of fingers is offset from an adjacent finger along the longitudinal axis. In some embodiments, the frangible portion is at least one of a line of reduced material thickness, a line of perforations in the material, or a score line. In some embodiments, the body has a substantially constant cross-sectional shape between the upper end and the lower end, and the cross-sectional shape is an "x" shape.

In various embodiments, the plurality of fingers extends substantially perpendicular to the longitudinal axis, and at least one finger of the plurality of fingers deflects in a counterclockwise direction and at least one finger of the plurality of fingers deflects in a clockwise direction when viewed along the longitudinal axis from above. In some embodiments, the at least two fingers of the plurality of fingers define a void to receive the stud and define an opening with a smaller diameter than the void to retain the stud.

Yet another particular embodiment of the present disclosure is an adjustable plate support system for positioning a weldment plate within a precast concrete panel, comprising a body extending between an upper end and a lower end along a longitudinal axis; a plurality of segments of the body positioned at the lower end of the body, a frangible portion is located between adjacent segments of the plurality of segments, and at least two adjacent segments of the plurality of segments each have a side flange extending substantially perpendicular to the longitudinal axis, wherein the frangible portion joins the side flanges of the two adjacent segments; and a plurality of fingers extending away from the body, wherein at least two fingers of the plurality of fingers are configured to deflect in opposing directions about the longitudinal axis to receive a stud extending from a weldment plate.

In various embodiments, each finger of the plurality of fingers has a recess and a protrusion. In some embodiments, the recesses of the fingers of the plurality of fingers are positioned adjacent to form a void configured to receive the stud. In various embodiments, the protrusions of the fingers of the plurality of fingers are positioned adjacent to retain the stud within the void. In some embodiments, a segmented portion of the body extends along a longer length of the longitudinal axis than a non-segmented portion. In various embodiments, the plurality of fingers is at least three fingers, wherein each finger of the plurality of fingers is offset from an adjacent finger along the longitudinal axis. In some embodiments, the system further comprises a precast concrete panel having a bottom surface and a top surface, wherein the weldment plate is exposed on the top surface of the precast concrete panel, and the lower end of the body is exposed on the bottom surface of the precast concrete panel.

A further particular embodiment of the present disclosure is a method of manufacturing a precast concrete panel with a weldment plate, comprising (i) providing a form that defines a precast concrete panel, wherein a bottom surface of the form defines a bottom surface of the precast concrete panel; (ii) positioning a plate support in the form, wherein the plate support has a body with a height that extends between an upper end and a lower end, the lower end contacts the bottom surface of the form, and a plurality of segments are positioned at the lower end of the body; (iv) breaking a frangible portion between adjacent segments of the plurality of segments to remove at least one segment of the plurality of segments to selectively adjust the height of the body; (v) positioning a stud body into a plurality of fingers extending away from the body, wherein the stud body extends downwardly from a lower surface of a weldment plate, and at least two fingers of the plurality of fingers deflect in opposing directions to receive the stud body; (vi) positioning the stud body within the plurality of fingers such that the lower surface of the weldment plate contacts the upper end of the body; and (vii) pouring concrete into the form to produce the precast concrete panel, wherein the weldment plate is exposed at a top surface of the precast concrete panel.

In some embodiments, the method further comprises (viii) breaking the frangible portion between adjacent segments of the plurality of segments to remove multiple segments of the plurality of segments to selectively adjust the height of the body. In various embodiments, the method further comprises (ix) deflecting distal ends of the at least two fingers of the plurality of fingers to position the stud in a void defined by the at least two fingers of the plurality of fingers, wherein the distal ends retain the stud in the void.

In some embodiments, each finger of the plurality of fingers has a recess and a protrusion, the recesses of the fingers of the plurality of fingers are positioned adjacent to form the void configured to receive the stud, and the protrusions of the fingers of the plurality of fingers are positioned at the distal ends of the fingers to retain the stud within the void. In various embodiments, the method further comprises (x) sliding the stud and the plurality of fingers relative to each other along a longitudinal axis of the body until the lower surface of the weldment plate contacts the upper end of the body. In some embodiments, the lower end of the body is exposed at a bottom surface of the precast concrete panel.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements or components. Additional aspects of the present disclosure will become more readily apparent from the Detailed Description, particularly when taken together with the drawings.

The above-described embodiments, objectives, and configurations are neither complete nor exhaustive. As will be appreciated, other embodiments of the disclosure are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and claims themselves.

BRIEF DESCRIPTION OF THE DRAWINGS

The accompanying drawings, which are incorporated in and constitute a part of the specification, illustrate embodiments of the disclosure and together with the Summary given above and the Detailed Description of the drawings given below, serve to explain the principles of these embodiments. In certain instances, details that are not necessary for an understanding of the disclosure or that render other details difficult to perceive may have been omitted. It should be understood, of course, that the disclosure is not necessarily limited to the particular embodiments illustrated herein. Additionally, it should be understood that the drawings are not necessarily to scale.

Figure 1:
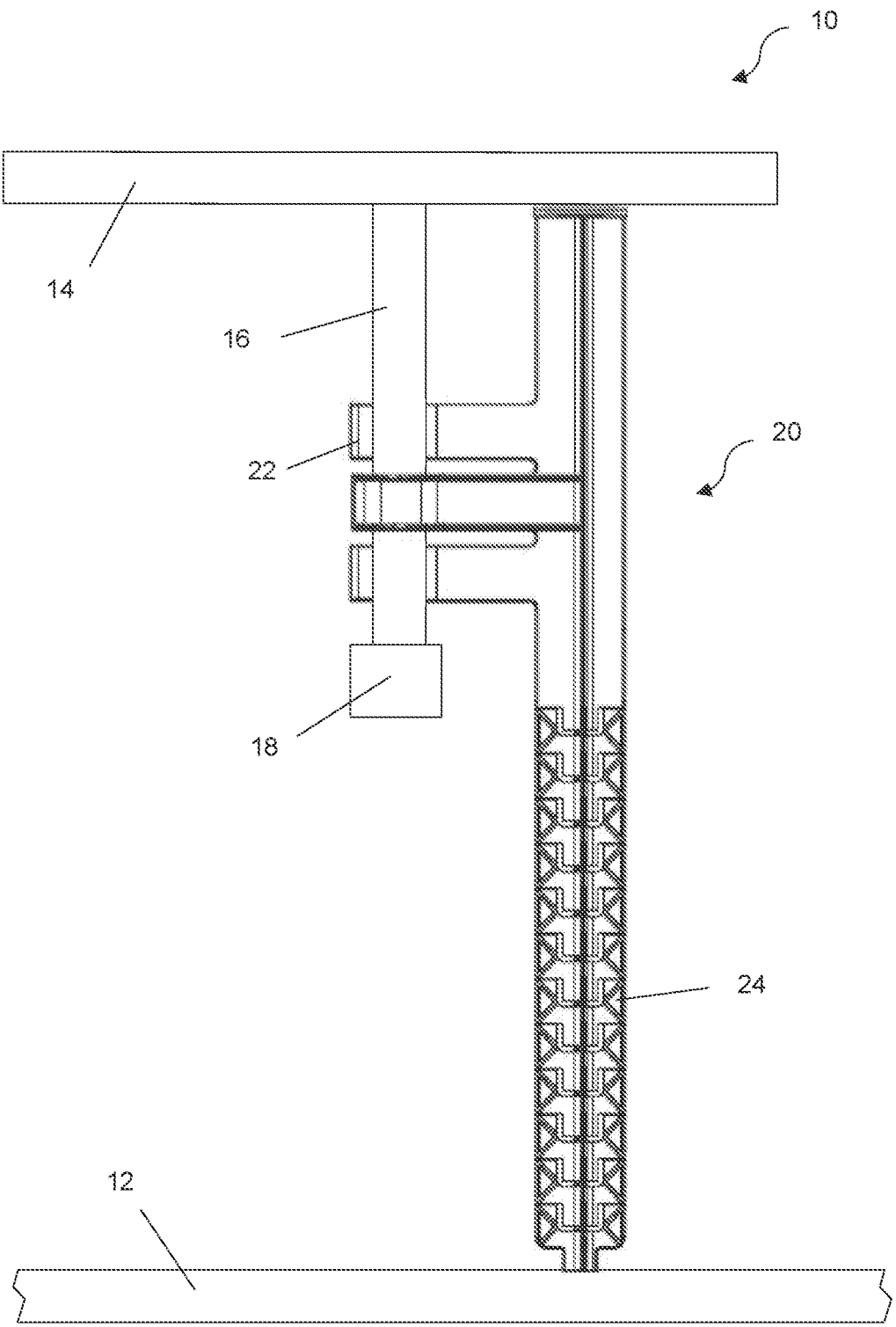
FIG. 1 is a side elevation view of a plate support system for a precast concrete panel in accordance with embodiments of the present disclosure.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

| Component No. | Component |
|---|---|
| 10 | Plate Support System |
| 12 | Form |
| 14 | Plate |
| 16 | Stud Shaft |
| 18 | Stud Head |
| 20 | Plate Support |
| 22 | First Adjustment Feature |
| 24 | Second Adjustment Feature |
| 26 | Body |
| 28 | First End |
| 30 | Second End |
| 32 | Segment |
| 34 | Finger |

-continued

| Component No. | Component |
|---|---|
| 36 | Top Flange |
| 38 | Frangible Line |
| 40 | Longitudinal Axis |
| 42 | First Width |
| 44 | Second Width |
| 46 | First Diameter |
| 48 | Second Diameter |
| 50 | Recess |
| 51 | Void |
| 52 | Protrusion |
| 53 | Opening |
| 54 | Side Flange |

DETAILED DESCRIPTION

The present disclosure has significant benefits across a broad spectrum of endeavors. It is the Applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment that illustrates the best mode now contemplated for putting the disclosure into practice is described herein by, and with reference to, the annexed drawings that form a part of the specification. The exemplary embodiment is described in detail without attempting to describe all of the various forms and modifications in which the disclosure might be embodied. As such, the embodiments described herein are illustrative, and as will become apparent to those skilled in the arts, may be modified in numerous ways within the scope and spirit of the disclosure.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the present disclosure are described herein and as depicted in the drawings. It is expressly understood that although the figures depict an adjustable plate support, and methods and systems for using the same, the present disclosure is not limited to these embodiments. In addition, terms such as "approximately" and "substantially" can mean a variation of +/−10% on a relative basis.

Now referring to FIG. 1, a side elevation view of a plate support system 10 is provided. The plate support system 10 comprises a form 12 that receives concrete to produce a precast concrete panel, a weldment plate 14 that provides a metal surface on part of the precast concrete panel, and a plate support 20 that supports the weldment plate 14 within the form 12 as concrete is poured into the form. The weldment plate 14 has a stud body 16 that extends downwardly from a bottom surface of the plate 14, and a stud head 18 is positioned at a distal end of the stud body 16. The diameter of the stud body 16 is less than a diameter of the stud head 18 to secure the weldment plate 14 to the concrete of the finish panel. An example of a stud is a Nelson stud, which typical has a body diameter of ½" or ¾". It will be appreciated that the stud body 16 can extend only partway to the bottom of the precast concrete panel, and in some embodiments, the stud body 16 extends completely to the bottom of the precast concrete panel.

As shown, the plate support 20 sets the plate 14 at a predetermined height above the form 12 such that the plate 14 is exposed on one side of the finished precast concrete panel. The plate support 20 has a first adjustment feature 22 that engages the stud body 16 to secure the plate support 20 relative to the plate 14 in a lateral direction. As explained in further detail below, aspects of the first adjustment feature 22 allow the feature 22 to engage stud bodies 16 with different diameters. Next, a second adjustment feature 24 establishes the height of the weldment plate 14 above the form 12. As explained in further detail below, the second adjustment feature 24 can comprise segments that can be selectively broken off to adjust the height of the plate 14 above the form 12.

Figure 2:
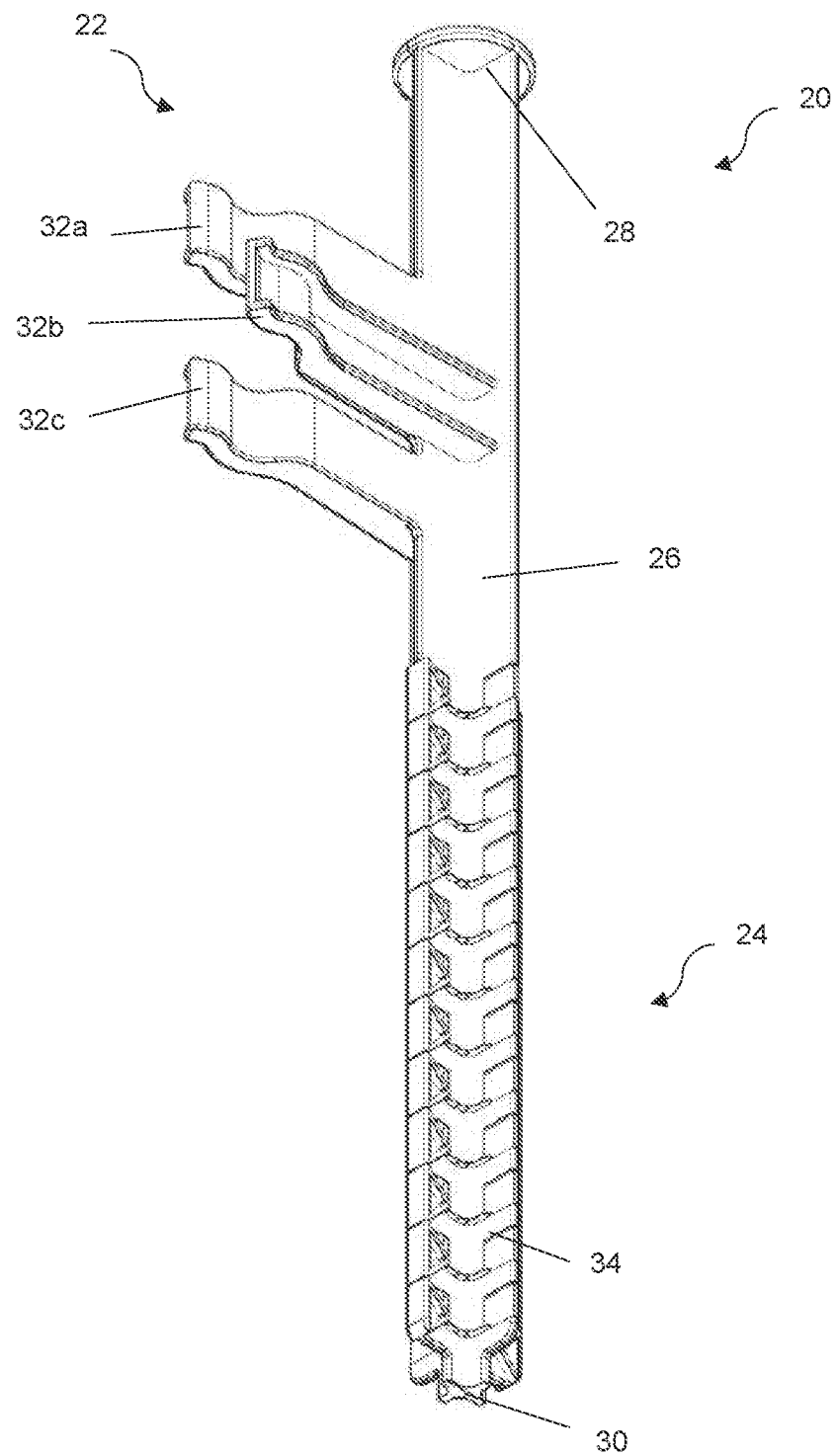
FIG. 2 is a perspective view of a plate support for a precast concrete panel in accordance with embodiments of the present disclosure.

Now referring to FIG. 2, a perspective view of a plate support 20 is provided. The body 26 of the plate support 20 extends from a first or upper end 28 to a second or lower end 30. The first adjustment feature 22 comprises three fingers 32a, 32b, 32c extending perpendicularly from the body 26 of the plate support 20. These fingers 32a, 32b, 32c are arranged to receive a stud body where two fingers 32a, 32c are positioned on one side of the stud body and one finger 32b is positioned on the other side of the stud body. The fingers 32a, 32b, 32c are deflectable outward to receive the stud body, and then bias inwardly to secure the stud body. It will be appreciated that embodiments of the present disclosure can include any number of fingers.

Next, the second adjustment feature 24 comprises a plurality of segments 34 positioned at the lower end 30 of the body 26. The segments 34 of the body 26 in this embodiment are configured to break away at frangible lines or portions to adjust the height of the plate support 20. The segments 34 can break away in ½" increments in some embodiments to conform to the variety of different precast concrete panel sizes. It will be appreciated that the increments may not be constant in some embodiments. For example, the most distal segment 34 may have a first height, the next segment 34 has a larger smaller height, and the next segment 34 has an even larger height, etc.

Figure 3:
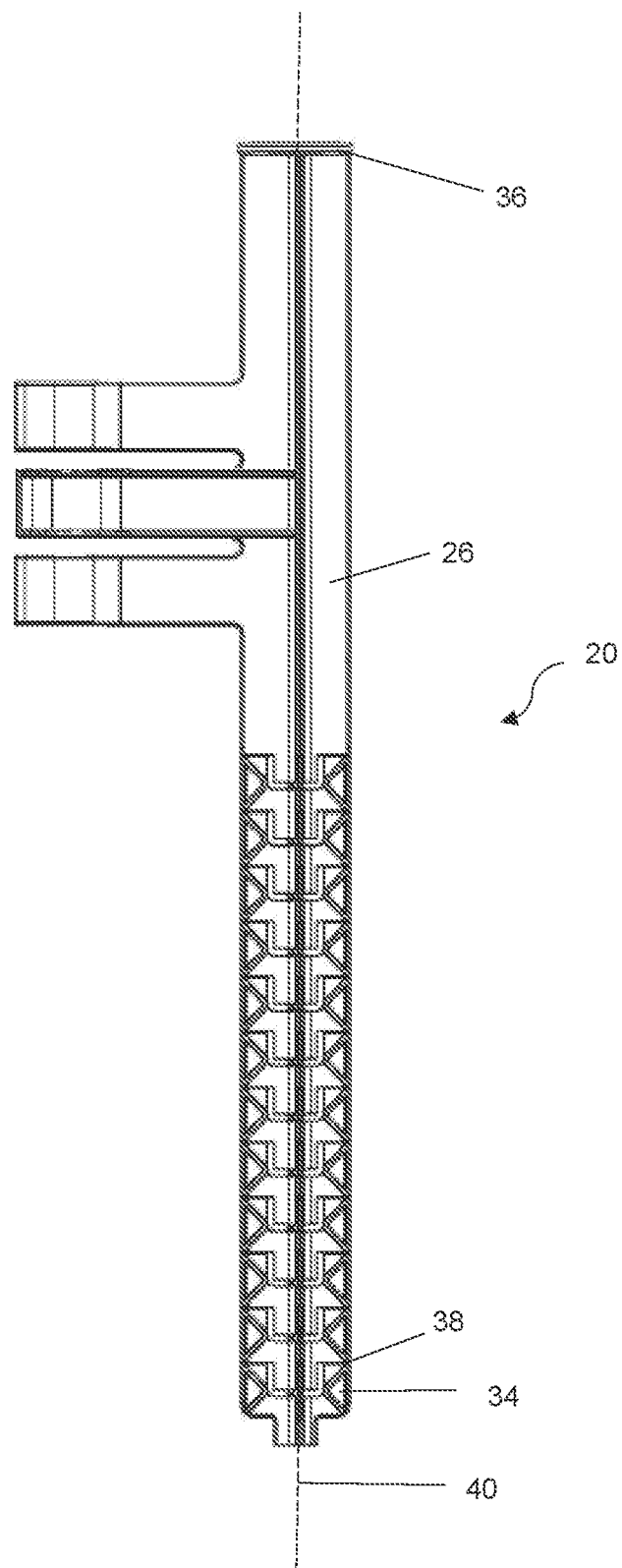
FIG. 3 is a side elevation view of a plate support for a precast concrete panel in accordance with embodiments of the present disclosure.

Now referring to FIG. 3, a side elevation view of the plate support 20 is provided. Between adjacent segments 34 is a frangible line 38 that can be broken with, for example, a pair of pliers to adjust the height of the plate support 20. The frangible line 38 can be a score line, a line of material with reduced thickness, perforations in the material, or any other line or boundary that is breakable when subject to a predetermined force. It will be appreciated that in some embodiments the segments 34 can be rotatably engaged with each other to adjust the vertical height of the support 20. In one embodiment, a segment 34 is threadably engaged with a distal end of the body 26, and rotation of the segment 34 relative to the body 26 changes the vertical height of the support 20. In other embodiments, one or more segments 34 can slide relative to each other in along a longitudinal axis of the body 26, and for example, a thumb screw can set the position of the segments 34 relative to each other along the longitudinal axis.

A top flange 36 is positioned at an upper end of the plate support 20 to contact the underside of the weldment plate. When viewed along a longitudinal axis 40, the top flange 36 has a larger cross sectional area than the body 26 or the segments 34. The body 26 of the plate support 20 is oriented along the longitudinal axis 40, and thus, the weight of the weldment plate is borne through the longitudinal axis 40.

Figure 4:
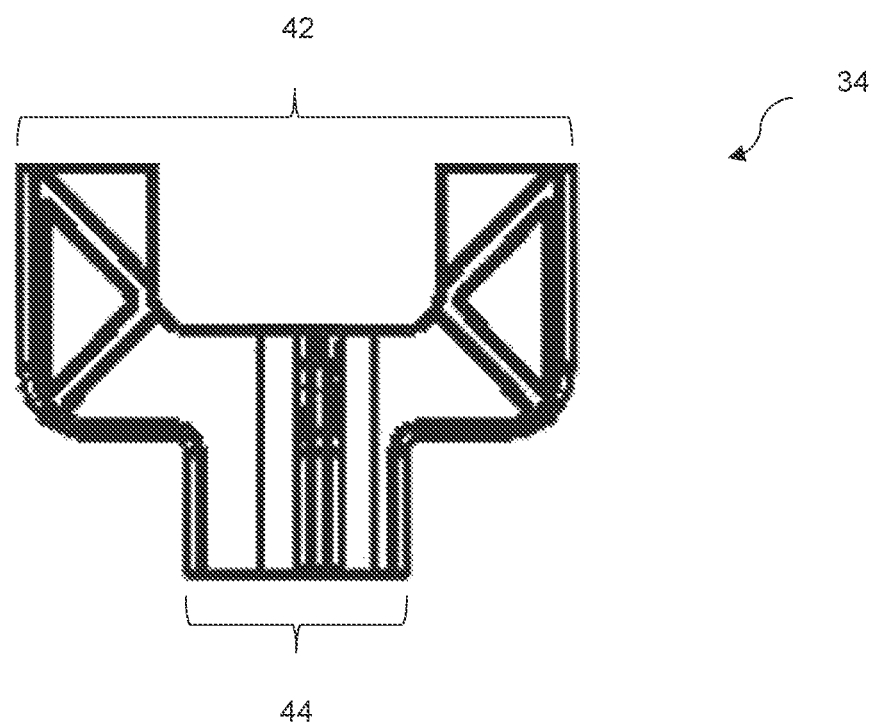
FIG. 4 is a side elevation view of a segment of a plate support for a precast concrete panel in accordance with embodiments of the present disclosure.

Now referring to FIG. 4, a side elevation view of a single segment 34 of the plurality of segments of the body is provided. The segment 34 has a shape where a first outer diameter 42 at an upper end of the segment 34 is larger than a second outer diameter 44 at a lower end. In addition, the shape of the segment 34 is such that adjacent segments 34 are nested within each other when arranged in a plurality of segments 34. The second outer diameter 44, in some embodiments, serves as the distal tip of the plate support that contacts the form. When concrete is poured into the form, the distal tip will be partially exposed on one side of the precast concrete panel. Thus, the smaller outer diameter 42 being oriented to the lower end results in a smaller portion of the plate support exposed on one side of the precast concrete panel. This is advantageous for the integrity of the outer surface of the precast concrete panel and preventing elements, such as water, from entering the precast concrete panel. This also improves the appearance of the precast concrete panel by making the support less noticeable.

Figure 5:
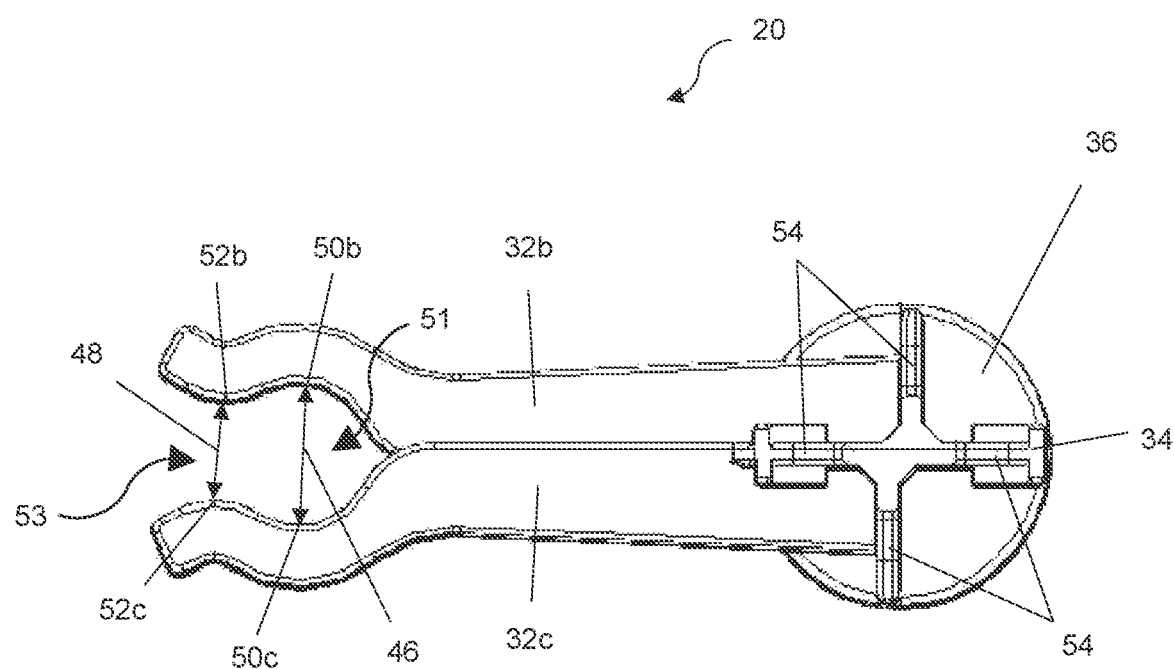
FIG. 5 is a bottom plan view of a plate support for a precast concrete panel in accordance with embodiments of the present disclosure.

Now referring to FIG. 5, a bottom plan view of a plate support 20 is provided. The second and third fingers 32b, 32c extend laterally from the body of the plate support 20, and the first finger 32a is obscured behind the third finger 32c. However, in this embodiment, the first finger 32a has the same features as the third finger 32c. The second finger 32b has a recess 50b and a protrusion 52b, and the third finger 32c has a recess 50c and a protrusion 52c. Together, the recesses 50a, 50b define a first inner diameter 46, and the protrusions 52a, 52b define a second inner diameter 48 that is smaller than the first inner diameter 46. Specifically, the recesses 50a, 50b define a void 51 that receives a stud body, and the protrusions 52a, 52b define an opening that receive and retain the stud body. In some embodiments, the fingers can engage at least two different sized stud bodies. Two common stud body diameters are ½" and ¾". Thus, with these two diameters 46, 48, the second inner diameter 48 would be less than ½", and the first inner diameter 46 would at least be deflectable to a distance of ¾". The deflection of the fingers to accommodate the stud can be described as a distal end of the fingers deflecting about a longitudinal axis of the support.

Next, the segments 34 and the body, generally, when viewed from the bottom have an "x" cross sectional shape, and the top flange 36 has a circular cross sectional shape. The segments 34 and the remaining non-segmented portion of the body have four side flanges 54 oriented at right angles to each other. This adds rigidity to the body and reduces deflection from side to side as the weight of the weldment plate is borne on the top flange 36 and transmitted through the body and the segments 34. Referring in part to FIG. 3, in some embodiments, the frangible line 38 can join adjacent side flanges 54 between adjacent segments 34 to maintain the rigidity of the segmented portion of the body 20. This allows the segmented portion of the body 20 extends along a longer length of the body 20 compared to the non-segmented portion to provide as much adjustability as possible to the plate support 20.

The description of the present disclosure has been presented for purposes of illustration and description, but is not intended to be exhaustive or limiting of the disclosure to the form disclosed. Many modifications and variations will be apparent to those of ordinary skill in the art. The embodiments described and shown in the figures were chosen and described in order to best explain the principles of the disclosure, the practical application, and to enable those of ordinary skill in the art to understand the disclosure.

While various embodiments of the present disclosure have been described in detail, it is apparent that modifications and alterations of those embodiments will occur to those skilled in the art. Moreover, references made herein to "the present disclosure" or aspects thereof should be understood to mean certain embodiments of the present disclosure and should not necessarily be construed as limiting all embodiments to a particular description. It is to be expressly understood that such modifications and alterations are within the scope and spirit of the present disclosure, as set forth in the following claims.

What is claimed is:

1. An adjustable plate support for positioning a weldment plate within a precast concrete panel, comprising:
    a body extending between an upper end and a lower end along a longitudinal axis;
    a plurality of segments of said body positioned at said lower end of said body, wherein a frangible portion is located between adjacent segments of said plurality of segments;
    a plurality of fingers extending away from said body, said plurality of fingers positioned between said upper end of said body and said plurality of segments along said longitudinal axis, wherein at least two fingers of said plurality of fingers are configured to deflect in opposing directions about said longitudinal axis to receive a stud extending from a weldment plate, wherein said plurality of fingers are configured to position said stud substantially parallel to said body; and
    a top flange positioned at said upper end of said body above said plurality of fingers, wherein said top flange has a different cross-section than said plurality of fingers.

2. The adjustable plate support of claim 1, wherein said top flange has a larger cross-sectional area compared to a cross-sectional area of said body, wherein said top flange is a plate.

3. The adjustable plate support of claim 1, wherein said plurality of fingers is positioned below said upper end of said body along said longitudinal axis a predetermined distance, wherein each finger of said plurality of fingers is positioned on opposite sides of said body and is offset from an adjacent finger along said longitudinal axis such that each finger of said plurality of fingers is at a different height along said longitudinal axis.

4. The adjustable plate support of claim 1, wherein said frangible portion is at least one of a line of reduced material thickness, a line of perforations in the material, or a score line.

5. The adjustable plate support of claim 1, wherein said body has a substantially constant cross-sectional shape between said upper end and said lower end, and said cross-sectional shape is an "x" shape.

6. The adjustable plate support of claim 1, wherein said plurality of fingers extends substantially perpendicular to said longitudinal axis, and at least one finger of said plurality of fingers deflects in a counterclockwise direction and at least one finger of said plurality of fingers deflects in a clockwise direction when viewed along said longitudinal axis from above.

7. The adjustable plate support of claim 1, wherein said at least two fingers of said plurality of fingers define a void to receive said stud and define an opening with a smaller diameter than said void to retain said stud.

8. A method of manufacturing a precast concrete panel with a weldment plate, comprising:
    providing a form that defines a precast concrete panel, wherein a bottom surface of said form defines a bottom surface of said precast concrete panel;
    positioning a plate support in said form, wherein said plate support has a body with a height that extends between an upper end and a lower end, said lower end contacts said bottom surface of said form, and a plurality of segments are positioned at said lower end of said body;
    breaking a frangible portion between adjacent segments of said plurality of segments to remove at least one segment of said plurality of segments to selectively adjust said height of said body;
    positioning a stud body into a plurality of fingers extending away from said body, wherein said stud body extends downwardly from a lower surface of a weldment plate, and at least two fingers of said plurality of fingers deflect in opposing directions to receive said stud body;
    positioning said stud body within said plurality of fingers such that said lower surface of said weldment plate contacts said upper end of said body; and
    pouring concrete into said form to produce said precast concrete panel, wherein said weldment plate is exposed at a top surface of said precast concrete panel.

9. The method of claim 8, further comprising breaking said frangible portion between adjacent segments of said plurality of segments to remove multiple segments of said plurality of segments to selectively adjust said height of said body.

10. The method of claim 8, wherein positioning said stud body into said plurality of fingers further comprises:
    deflecting distal ends of said at least two fingers of said plurality of fingers to position said stud in a void defined by said at least two fingers of said plurality of fingers, wherein said distal ends retain said stud in said void.

11. The method of claim 10, wherein each finger of said plurality of fingers has a recess and a protrusion, said recesses of said fingers of said plurality of fingers are positioned adjacent to form said void configured to receive said stud, and said protrusions of said fingers of said plurality of fingers are positioned at said distal ends of said fingers to retain said stud within said void.

12. The method of claim 8, wherein positioning said stud body within said plurality of fingers further comprises:
    sliding said stud and said plurality of fingers relative to each other along a longitudinal axis of said body until said lower surface of said weldment plate contacts said upper end of said body.

13. The method of claim 8, wherein said lower end of said body is exposed at a bottom surface of said precast concrete panel.

* * * * *